United States Patent [15] 3,659,202

Kaneko [45] Apr. 25, 1972

[54] DATA TRANSMISSION SYSTEM

[72] Inventor: Hisashi Kaneko, Tokyo, Japan

[73] Assignee: Nippon Electric Co., Ltd., Tokyo, Japan

[22] Filed: May 21, 1970

[21] Appl. No.: 39,322

Related U.S. Application Data

[63] Continuation-in-part of Ser. No. 708,036, Feb. 26, 1968, abandoned.

[52] U.S. Cl. ..................................325/30, 178/67, 325/163, 325/320

[51] Int. Cl. ..........................................H03c 3/38, H04b 1/04

[58] Field of Search ...................178/66 R, 67, 66 A; 325/30, 325/163, 320, 38 A

[56] References Cited

UNITED STATES PATENTS 3,335,369 8/1967 Priebe...............................325/163 X 3,421,088 1/1969 Salley.................................178/67 X

*Primary Examiner*—Robert L. Richardson

*Assistant Examiner*—Kenneth W. Weinstein

[57] ABSTRACT

A data transmission system of the type for transmitting multi-level information signals in the form of discretely shifted phases of a carrier wave includes a phase shifter in the transmitter responsive to a level change in the multi-level information signal for unidirectionally phase shifting the carrier. The phase shifter includes an oscillator generating a signal of $mf_c$ where $f_c$ is the carrier frequency and m is the number of phases. At the receiver, a phase detector derives the input carrier phase as a voltage level which is amplitude discriminated and the multi-level signal is logically derived.

4 Claims, 28 Drawing Figures

INVENTOR.
HISASHI KANEKO

BY Sandoe, Hopgood & Calimafde

ATTORNEYS

Patented April 25, 1972

3,659,202

3 Sheets-Sheet 2

INVENTOR
HISASHI KANEKO
by
Sandoe, Hopgood & Calimafde
ATTORNEYS

INVENTOR.
HISASHI KANEKO
BY
Sandoe, Hopgood & Calimafde
ATTORNEYS

DATA TRANSMISSION SYSTEM

This application is a continuation-in-part of application Ser. No. 708,036 filed Feb. 26, 1968, now abandoned.

The present invention relates to a data transmission system for transmitting digital data for example in the form of "0" and "1" binary digits as used in telegraphy or telex.

Conventionally, amplitude modulation, frequency modulation, and phase modulation have been employed for the transmission of such data. With such systems, however, high speed transmission is not possible because of the restricted frequency band. Recently, in order to improve the transmission speed, resort has been had to three-valued and four-valued multi-level signal conversion. These systems have been called "multi-level AM," "multi-level FM," and "multi-phase PM." Particularly, with respect to the last-mentioned system, four-phase and eight-phase PM transmission systems are now known. While the known multi-level transmission systems have improved the transmission rate, this improvement is inherently restricted by the available number of multi-levels since severe intercode interference results as the number of levels increases.

Accordingly, it is the object of this invention to provide a narrow band, high speed data transmission system which obviates the foregoing problems in the known systems.

Briefly, the present invention is predicated on a multi-phase PM transmission wherein waveform distortion is reduced by keeping the phase shift continuously advancing in one direction with a view towards avoiding the dispersion of energy in the frequency region.

The above mentioned and other features and objects of this invention and the manner of attaining them will become more apparent and the invention itself will best be understood by reference to the following description of an embodiment of the invention taken in conjunction with the accompanying drawings, the description of which follows.

Figure 1:
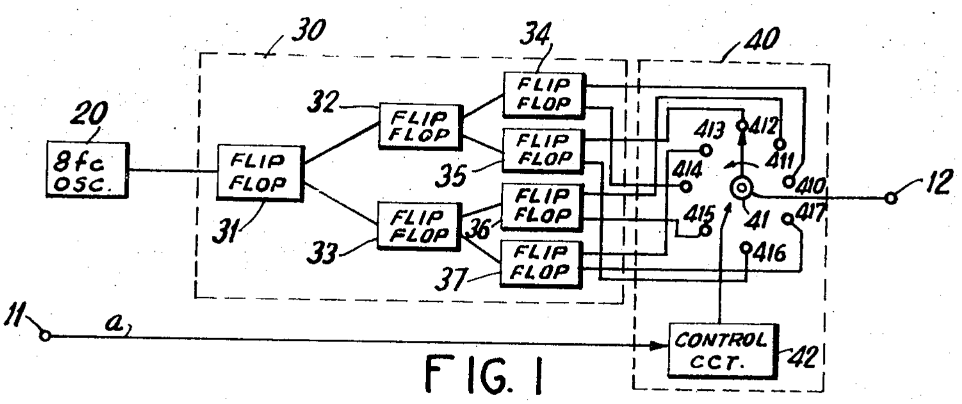
FIG. 1 and FIG. 2 show, respectively, in block form a transmitter modulator and receiving demodulator of the transmission system according to the invention.
Figure 2:
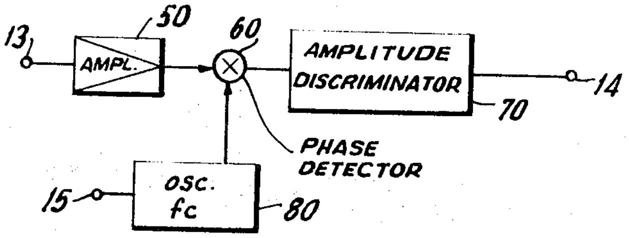

Referring now to FIGS. 1 and 2, the modulator and demodulator of the present system will be described. Although it is assumed that the present system is designed to produce eight-phase transmission, it will be apparent to those skilled in the art that four-phase or 16-phase systems may be similarly derived.

Figure 3:
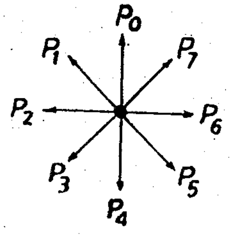
FIG. 3 is a vector diagram for explaining the operation of the embodiment of FIGS. 1 and 2.

Oscillator 20 generates a signal of $8f_c$, where $f_c$ is the carrier frequency. This signal is fed to an eight-phase signal generator 30 including seven flip-flops, 31–37 connected as shown, (FIGS. 1 and 6) and generating output signals $P_0$, $P_1$ ... and $P_7$ which are mutually displaced in phase by $\pi/4$ radians. The vector diagram of FIG. 3 shows the relation of these output signals. The eight-phase signals are fed to a phase shift modulator 40 which includes a rotary switch 41, and a control circuit 42 for controlling the stepwise motion of the switch. Modulator 40, switch 41 and control circuit 42 are described in greater detail below with reference with FIG. 6. Broadly described, switch 41 is composed of electronic components (the switch being only an analogy) and control circuit 42 may be a simple ring counter which responds to a change in state of the input binary signal from 0 to 1, to 1 to 0, to unidirectionally step switch 41. For an information signal having $n$-levels (wherein $n$ is an integer greater than 1), the amount of each unidirectional phase shift is equal to $$\frac{360°}{m}\cdot i$$

(where $m$ is an integer greater than $2n$, and $i$ is a positive integer greater than $n$.)

Figure 4:
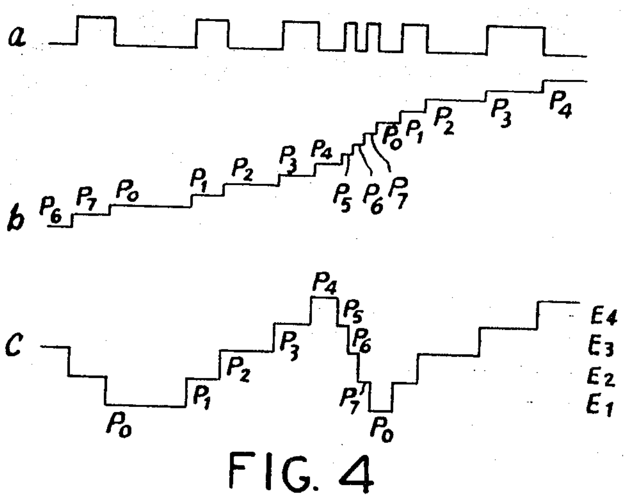
FIG. 4 is a waveform diagram for explaining the operation of the embodiment of FIGS. 1 and 2.

Upon the application of the input two-valued multi-level signal shown in FIG. 4(*a*) to the input terminal 11, control circuit 42 of phase modulation circuit 40 energizes switch 41 to make a unidirectional stepwise move at every leading and trailing edge of the two-valued wave *a*. Stated differently, the phase shift modulated signal of frequency $f_c$, appearing at the output terminal 12, is phase shifted $\pi/4$ radians from phase $P_0$ to $P_1$, $P_1$ to $P_2$, to $P_3$, and so on, every time the waveform *a* undergoes a change in state or level as shown in FIGS. 4*a* and 4*b*. The phase shift modulated output is then extracted from the terminal 12 and conventionally transmitted to a receiver after being subjected to a suitable power amplification.

Any receiver capable of demodulating the phase shift modulation may be used as a receiver for the present system. At the receiver, each of the phases $P_0$, $P_1$, ... $P_7$ is discriminated by a phase detection circuit and caused to produce code "1" in response to odd-numbered phases $P_1$, $P_3$, $P_5$, and $P_7$, and code "0" in response to even-numbered phases $P_0$, $P_2$, $P_4$, and $P_6$. This follows from the unidirectional shift caused by each level change.

FIG. 2 shows an example of a phase detector to be included in the receiver. The phase shift modulated signal conventionally received and supplied to input terminal 13 is amplified by amplifier 50 and then phase-discriminated by a phase detector 60, which may be composed of a multiplying and an integrating circuit. The output of detector 60 is converted to a binary or two-valued signal by an amplitude discriminator 70 (as will be explained). The thus obtained binary signal is then extracted from an output terminal 14.

In more detail, a reference phase signal generator 80 produces an oscillation at frequency $f_c$, which is multiplied at detector 60 by the input phase shift modulated signal. The product of the input and reference phase signals is integrated at the detector 60. When the input signal is in phase with the reference phase signal, detector 60 produces an output of a unit relative magnitude. On the other hand, when these signals are out of phase by $\theta$, the detector 60 produces an output of a magnitude represented by sin $\theta$. A phase detector capable of performing such an operation is well known and will not be detailed further herein. It should be noted that when the output of amplifier 50 and generator 80 are preliminarily amplitude-limited into rectangular waves, a phase difference $\theta$ less than $\pm\pi$ radians of the input signal is converted into the output of the magnitude of $$\left(\frac{2}{\pi}\Big/\theta/-1\right)$$

The waveform of the output of phase detector 60 is shown in FIG. 4*c* in which $P_0$, $P_1$, ... and $P_7$ indicate the amounts of phase shift to which the related levels correspond. Phase $P_0$ is assumed to be the reference phase. As will be obvious from FIG. 4(*c*), the level of the detector output steps up as the phase shifts from $P_1$ to $P_2$ to $P_3$ to $P_4$ and steps down as the phase further shifts from $P_5$ to $P_6$ to $P_7$ to $P_0$. The levels representative of phase $P_1$, $P_2$, and $P_3$ correspond to those of phase $P_7$, $P_6$, and $P_5$, respectively. Amplitude discriminator 70 discriminates these levels with reference to preset discrimination levels $E_1$, $E_2$, $E_3$, and $E_4$.

Figure 5:
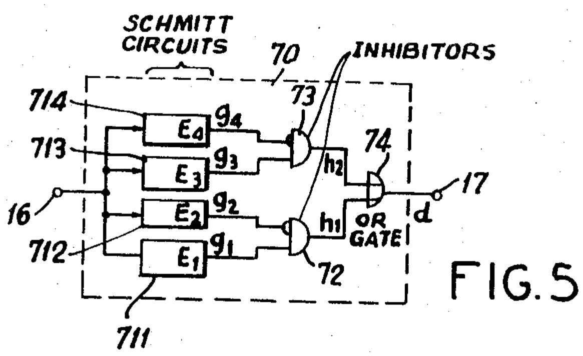
FIG. 5 is a block diagram illustrating the details of the amplitude discriminator in the embodiment of FIG. 2.

Discriminator 70 is shown in greater detail in FIG. 5 and includes four Schmitt trigger circuits 711, 712, 713 and 714. These circuits in combination serve as a comparator for comparing the input signal voltage with preset reference voltages $E_1$, $E_2$, $E_3$, and $E_4$, to produce code "1" as outputs $g_1$, $g_2$, $g_3$, and $g_4$ when the input is greater than the reference voltages $E_1$, $E_2$, $E_3$, and $E_4$. The outputs $g_1$ and $g_2$ of circuits 711 and 712 are supplied to the input and inhibit input, respectively, of an inhibitor circuit 72. Similarly, the outputs $g_3$ and $g_4$ of circuits 713 and 714 are respectively applied to the input and inhibit input of another inhibitor circuit 73. The outputs of inhibitor circuits 72 and 73 are applied to an OR gate 74. Assuming, for example, that the phase at one instant is $P_2$, the outputs $g_1$, and $g_2$ will be equal to 1 ($g_1=g_2=1$), whereas the outputs $g_3$ and $g_4$ will be equal to 0 ($g_3=g_4=0$). It follows therefore that $d=h_1+h_2=g_1\cdot\bar{g}_2+g_3\cdot\bar{g}_4=1.0+0.1=0$, and consequently that the output $d$ at OR gate 74 is "0." On the other hand, when the phase is at $P_5$, the relations $g_1=g_2=g_3=1$, and $g_4=0$ hold, and it follows that $d=h_1+h_2=g_1\cdot\bar{g}_2+g_3\cdot\bar{g}_4=1.0+1.1=1$, and that the output $d$ is therefore "1." Thus, the amplitude discriminator 70 enables the distinction of the odd-numbered and even-numbered phases to reproduce the two-valued signal wave $a$ at the receiver.

The reference phase signal generator 80 generates a sinusoidal or rectangular wave in phase with $P_0$ and is forcibly phase-synchronized in a known manner with the multiphase generator 30 of the transmitter. For this purpose, the signal at phase $P_0$, extracted from generator 30, may be transmitted to the receiver through a separate transmission channel. Alternatively, the $P_0$ phase component may be synchronously extracted in any well-known manner from the phase-detected output at terminal 14. The synchronization information is applied to a phase-locked oscillator in generator 80 to effect phase locking. Since any conventional synchronization technique may be adopted for this purpose, forced phase locking will not be discussed further herein.

Figure 6:
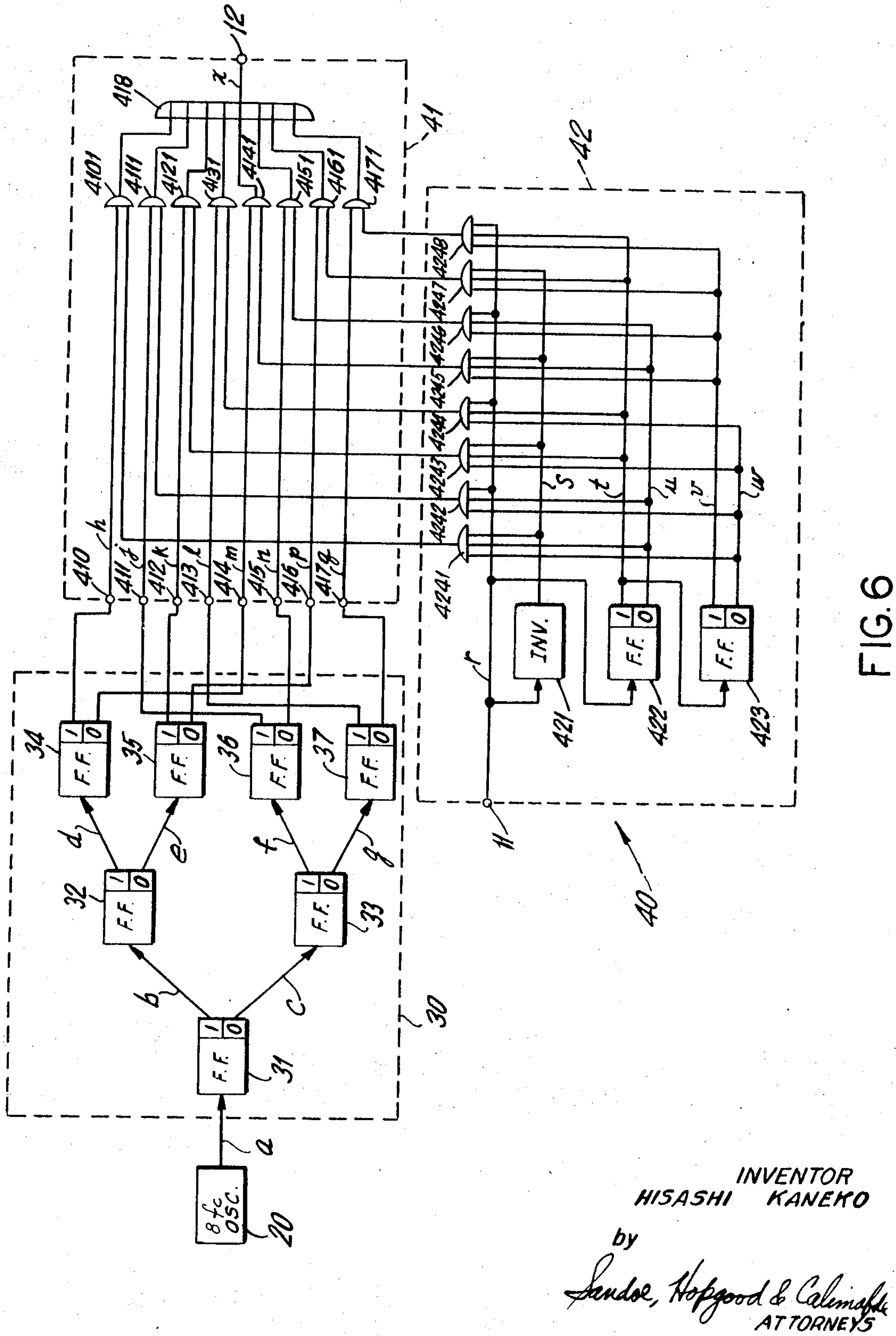
FIG. 6 is a more detailed schematic in block form of the transmitter of FIG. 1.

FIG. 6 illustrates in greater detail the transmitter of FIG. 1 and corresponding sections in the two figures are identified by corresponding reference numerals. As shown in FIGS. 1 and 6 signal generator 30 receives the carrier frequency signal 8$fc$ (FIG. 7$a$) from oscillator 20. Generator 30 includes a flip-flop 31 having a high output (FIG. 7$b$) connected to flip-flop 32, and a low output (FIG. 7$c$) connected to flip-flop 33.

The high output (FIG. 7$d$) of flip-flop 32 is connected to flip-flop 34, and the low output (FIG. 7$e$) of flip-flop 32 is connected to flip-flop 35. Similarly, the high and low outputs of flip-flop 33 (FIGS. 7$f$ and 7$g$) are respectively connected to flip-flops 36 and 37.

The high and low outputs (FIGS. 7$h$ and 7$m$) of flip-flop 34 are respectively connected to terminals 410 and 414 of switch 41, and the high and low outputs (FIGS. 7$k$ and 7$p$) of flip-flop 35 are respectively connected to switch terminals 412 and 416. Similarly, the high and low outputs (FIGS. 7$j$ and 7$n$) of flip-flop 36 are connected to switch terminals 411 and 415, and the high and low outputs (FIGS. 7$l$ and 7$q$) of flip-flop 37 are connected to switch terminals 413 and 417.

The input information signal (FIG. 7$n$) at input terminal 11 is connected to control circuit 42 at an inverter 421 and to one of the inputs of AND gates 4242, 4244, 4246 and 4248. The inverted information signal (FIG. 7$s$) is applied to one input of AND gates 4241, 4243, 4345 and 4347.

The information signal is also coupled to a flip-flop 422 having a high output (FIG. 7$t$) connected to a second input of AND gates 4243, 4244, 4247 and 4248, and a low input (FIG. 7$u$) connected to a second input of AND gates 4241, 4242, 4245 and 4246. The high output of flip-flop 422 is also connected to a flip-flop 423. The latter flip-flop has a high output (FIG. 7$v$) connected to a third input of AND gates 4245-4248 and a low output (FIG. 7$w$) connected to a third input of AND gates 4241-4244.

Terminals 410–417 of switch 41 are respectively connected to one input of AND gates 4101–4171, the other input of which are obtained respectively from the outputs of AND gates 4241–4248. The output of AND gates 4101–4171 are connected to the input of an OR gate 418 the output of which (FIG. 7$x$) is derived at terminal 12.

Figure 7:
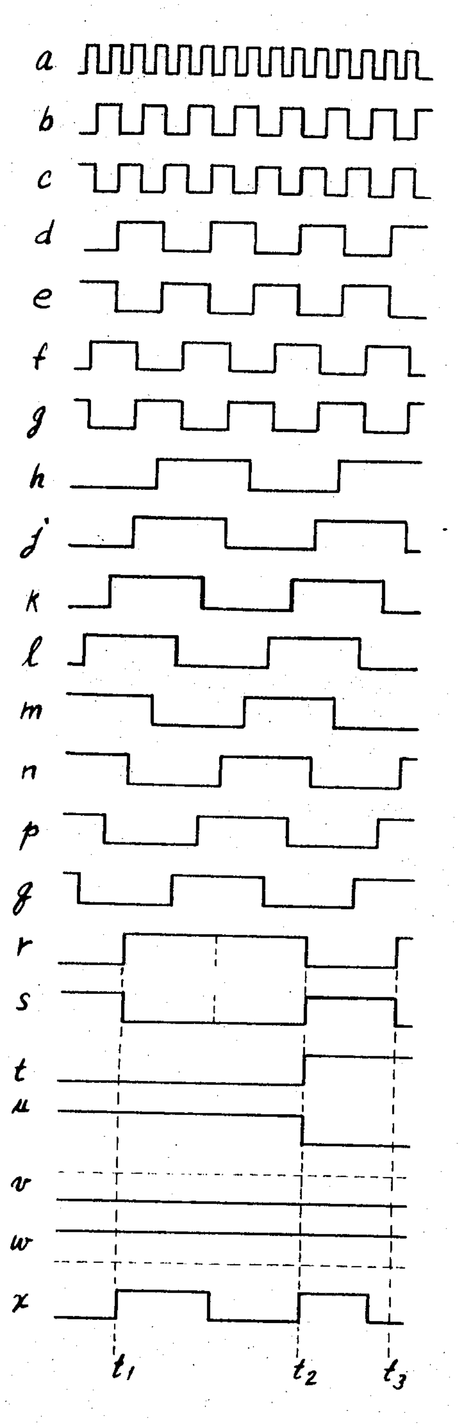
FIGS. 7*a*–7*x* illustrate the waveforms of the signals occurring in the transmitter of FIG. 6.

In operation, it is assumed that the high output of flip-flop 34 is transmitted through AND-gate 4101 and OR-gate 418 to the output terminal 12 before time point $t_1$ of FIG. 7. This assumption is justified because AND-gate 4241 is in the on state. At time $t_1$, the input information signal changes its state from "0" to "1." At the same time, the inverted information signal is changed from "1" to "0" state. Then AND-gate 4241 is changed from the off to the on state, since the information signal and the low outputs of flip-flops 422 and 423 (FIGS. 7$r$, 7$u$ and 7$w$) are in "1" state. Hence, the high output of flip-flop 36 (FIG. 7,) is transmitted through AND-gate 4111 and OR-gate 418 to the terminal 12. Similarly, at the time point $t_2$, the high output of flip-flop 35 is transmitted through AND-gate 4121, and at the time point $t_3$, the high output of flip-flop 37 is transmitted through AND-gate 4132. Thus, the unidirectional phase shift is performed in the order of signals 7$h$ → 7$j$ → 7$k$→ 7$l$ → 7$m$ → .. every time the information signal is changed from one state ("1" of "0") to another ("0" or "1").

The present invention thus makes it possible to transmit high-density data with a rather restricted frequency band. The reason for this may be summarized as follows: Inasmuch as the phase shift (by $\pi/4$ radians) is always made unidirectionally, the largest frequent change of state ("0" to "1," "1" to "0") in waveform $a$ (FIG. 4) repeated every $T_0$ second merely causes the phase $b$ to be shifted by $\pi/4$ radians at every $T_0$ second period. On the other hand, a frequency deviation is defined as the time-differentiation situation, frequency $f_c$ Hz. is shifted to $(f_c-\frac{1}{8}T_0)$ Hz. It follows therefore that a frequency bandwidth of one-fifth $T_0$ will be sufficient to deal with the phase shift modulated signal of the present invention, even when an adequate tolerance is taken into account. To compare this with a conventional system the corresponding bandwidth will have to be at least (one-half $T_0$) Hz. if the corresponding eight-phase phase shift transmission ($2^3=8$) is assumed. This is because the bandwidth will extend up to (one-third $T_0$) Hz as a result of a reduction in the transmission rate to one-third as high as the present invention, and because some tolerance must still be taken into consideration.

It may be said therefore that about one-half of the necessary bandwidth of a conventional system is sufficient to provide a comparable transmission when the system of the present invention is adopted, and that the present invention provides quite an efficient data transmission system.

According to the invention, an asynchronous two-valued signal as well as a synchronized two-valued signal may be transmitted. A synchronized signal is exemplified by a PCM signal having a predetermined clock frequency. It is obvious that the present system is quite effective to such a synchronized system. In such a case, the state-changing points may be made to correspond to code "1" and other points to code "0." An asynchronous two-valued signals is exemplified by a facsimile signal, in which "1" and "0" respectively represents black and white scanned elementary picture.

In the foregoing, the description has been restricted to the case where the information to be transmitted is two-valued. It will be readily understood, however, that four-valued data may similarly be transmitted so long as the phase shift is made as described, unidirectionally. However, the technical advantage of the present system as applied to the four-valued data is not as great as that in the two-valued data. Further, the described phase shift modulation method may be replaced by another technique such as is described in FIGS. 10.4, 10.5 and 10.7 of "Data Transmission System," W. R. Bennett and James R. Davey, McGraw-Hill, 1965.

As has been described, the present invention makes it possible, with a rather simple structure in the transmitter and receiver, to transmit data through a communication channel of narrower bandwidth (or, when an equal bandwidth is used, at higher transmission speed) than conventional systems.

What is claimed is:

1. In a data transmission system of the type for transmitting a non-predetermined sequence of information signals at first and second levels in the form of discretely shifted phases of a carrier wave and for deriving the information signals therefrom at the receiving end, and including a transmitter and receiver, the improvement comprising: means in the transmitter for generating a carrier wave; means for unidirectionally phase shifting said carrier wave by continuously advancing the phase of said carrier in one direction by a value $360/m°$, where $m$ is an integer greater than 2, said value not exceeding 120°, every time said information signal changes from one of said levels to the other of said levels throughout the sequence; and means in the receiver for unambiguously deriving said information signal from said phase changes.

2. The improvement claimed in claim 1, in which said phase shifting means comprises an oscillator generating a signal of a frequency $mf_c$ where $f_c$ is the carrier frequency, an $m$-phase signal generator coupled to said oscillator, a phase shift modulator coupled to said $m$-phase generator, and a control circuit responsive to said multi-valued signal and coupled to said phase shift modulator for unidirectionally phase shifting said carrier wave every time said information signal changes levels.

3. The improvement claimed in claim 2, wherein said means in said receiver comprises a phase shift detector for deriving the input carrier phase as a voltage level, and an amplitude discriminator coupled to said phase detector for deriving said information signal.

4. The improvement claimed in claim 3, wherein said amplitude discriminator comprises a multi-output comparator for comparing the voltage level with preset reference voltages, and a logic circuit coupled to the multi-outputs of said comparator.

* * * * *